United States Patent
Rose

(10) Patent No.: US 11,222,352 B2
(45) Date of Patent: Jan. 11, 2022

(54) AUTOMATIC BILLING PAYMENT SYSTEM

(71) Applicant: Square, Inc., San Francisco, CA (US)

(72) Inventor: Cody Rose, San Francisco, CA (US)

(73) Assignee: Square, Inc., San Francisco, CA (US)

(*) Notice: Subject to any disclaimer, the term of this patent is extended or adjusted under 35 U.S.C. 154(b) by 400 days.

(21) Appl. No.: 16/011,421

(22) Filed: Jun. 18, 2018

(65) Prior Publication Data

US 2018/0300825 A1    Oct. 18, 2018

Related U.S. Application Data

(63) Continuation of application No. 14/229,654, filed on Mar. 28, 2014, now Pat. No. 10,002,397, which is a
(Continued)

(51) Int. Cl.
*G06Q 50/12* (2012.01)
*G06Q 30/04* (2012.01)
(Continued)

(52) U.S. Cl.
CPC ......... *G06Q 30/0226* (2013.01); *G06Q 10/02* (2013.01); *G06Q 20/102* (2013.01);
(Continued)

(58) Field of Classification Search
CPC .. G06Q 30/0226; G06Q 10/02; G06Q 20/102; G06Q 20/14; G06Q 20/20;
(Continued)

(56) References Cited

U.S. PATENT DOCUMENTS 5,844,572 A    12/1998   Schott
5,991,749 A    11/1999   Morrill
(Continued)

FOREIGN PATENT DOCUMENTS

WO    2015/066059 A1    5/2015

OTHER PUBLICATIONS

Mark Finn, "I Am Here Now: Determining Value in Location Based Services", published by Swinburne University of Technology in 2011 (Year: 2011).*
(Continued)

*Primary Examiner* — Omar Zeroual
(74) *Attorney, Agent, or Firm* — Polsinelli PC—Square

(57) ABSTRACT

A payment system can accept an electronic reservation for a merchant restaurant in response to a reservation request received from a user. The payment system can detect that the user is present at a location associated with the merchant restaurant based at least in part on an indication received from a mobile device associated with the user. The payment system can determine a completion of a service associated with the electronic reservation. The payment system can provide an electronic bill for the service to be displayed on the mobile device of the user. Based on receiving an authorization of the electronic bill from the mobile device of the user, the payment system can charge, through a card-less payment transaction, the user for at least an amount disclosed in the electronic bill.

21 Claims, 6 Drawing Sheets

Related U.S. Application Data continuation of application No. 14/219,974, filed on Mar. 19, 2014, now Pat. No. 9,721,314.

(60) Provisional application No. 61/896,618, filed on Oct. 28, 2013.

(51) Int. Cl.
| | | |
|---|---|---|
| *G06Q 20/32* | (2012.01) | |
| *G06Q 10/02* | (2012.01) | |
| *G06Q 20/14* | (2012.01) | |
| *G06Q 20/20* | (2012.01) | |
| *G06Q 30/02* | (2012.01) | |
| *G06Q 20/10* | (2012.01) | |
| *G06Q 30/06* | (2012.01) | |

(52) U.S. Cl.
CPC .............. *G06Q 20/14* (2013.01); *G06Q 20/20* (2013.01); *G06Q 20/3223* (2013.01); *G06Q 20/3224* (2013.01); *G06Q 30/04* (2013.01); *G06Q 30/0631* (2013.01); *G06Q 50/12* (2013.01); *G06Q 20/145* (2013.01)

(58) Field of Classification Search
CPC ........... G06Q 20/3223; G06Q 20/3224; G06Q 30/04; G06Q 30/0631; G06Q 50/12; G06Q 20/145
See application file for complete search history.

(56) References Cited

U.S. PATENT DOCUMENTS

| | | | | |
|---|---|---|---|---|
| 6,157,927 | A | 12/2000 | Schaefer et al. | |
| 7,089,208 | B1* | 8/2006 | Levchin | G06Q 20/02 705/39 |
| 7,457,767 | B1* | 11/2008 | Dunsmore | G06Q 20/204 705/17 |
| 7,580,699 | B1* | 8/2009 | Shaw | G06Q 30/0222 455/410 |
| 7,596,530 | B1* | 9/2009 | Glasberg | G06Q 20/02 705/30 |
| 7,742,941 | B2* | 6/2010 | Yamauchi | G06Q 20/26 705/13 |
| 7,877,299 | B2* | 1/2011 | Bui | G06Q 30/0601 705/26.41 |
| 7,953,642 | B2* | 5/2011 | Dierks | G06Q 30/06 705/26.1 |
| 8,015,070 | B2 | 9/2011 | Sinha et al. | |
| 8,020,763 | B1 | 9/2011 | Kowalchyk et al. | |
| 8,438,066 | B1* | 5/2013 | Yuen | G06Q 20/3278 705/21 |
| 8,498,900 | B1* | 7/2013 | Spirin | G06Q 20/14 705/15 |
| 8,615,445 | B2 | 12/2013 | Dorsey et al. | |
| 8,655,837 | B2 | 2/2014 | Beckstrom et al. | |
| 8,744,968 | B1* | 6/2014 | Grigg | G06Q 40/00 705/44 |
| 8,830,030 | B2* | 9/2014 | Arthurs | G06Q 50/12 340/5.8 |
| 8,949,142 | B1* | 2/2015 | Angrish | G06Q 20/202 705/15 |
| 9,373,112 | B1* | 6/2016 | Henderson | G06Q 20/227 |
| 9,393,460 | B1* | 7/2016 | Emigh | A61B 5/103 |
| 9,576,284 | B2 | 2/2017 | Runyan | |
| 9,665,858 | B1 | 5/2017 | Kumar | |
| 9,721,314 | B2 | 8/2017 | Rose | |
| 9,875,469 | B1 | 1/2018 | Chin et al. | |
| 10,002,397 | B2 | 6/2018 | Rose | |
| 10,043,164 | B2* | 8/2018 | Dogin | G06Q 30/00 |
| 10,134,032 | B2* | 11/2018 | Govindarajan | G06Q 20/382 |
| 10,217,159 | B2* | 2/2019 | Zambo | G06Q 30/0635 |
| 10,304,276 | B2* | 5/2019 | Schwartz | G07C 11/00 |
| 10,373,170 | B2* | 8/2019 | Baker | G06Q 30/0601 |
| 10,387,874 | B1* | 8/2019 | Birand | G06Q 20/385 |
| 10,726,411 | B2* | 7/2020 | Nuzzi | G06Q 20/3224 |
| 10,937,049 | B2* | 3/2021 | Scipioni | G06Q 30/0207 |
| 11,023,869 | B1* | 6/2021 | Kumar | G06Q 20/388 |
| 2002/0016765 | A1* | 2/2002 | Sacks | G06Q 20/12 705/39 |
| 2002/0069165 | A1* | 6/2002 | O'Neil | G06Q 20/102 705/40 |
| 2003/0078793 | A1* | 4/2003 | Toth | G06Q 50/12 705/15 |
| 2003/0115095 | A1* | 6/2003 | Yamauchi | G06Q 20/26 705/13 |
| 2003/0172028 | A1* | 9/2003 | Abell | H04W 4/24 705/40 |
| 2003/0177020 | A1* | 9/2003 | Okamura | G06Q 10/02 705/5 |
| 2004/0015403 | A1* | 1/2004 | Moskowitz | G06Q 30/0601 705/26.61 |
| 2004/0054592 | A1 | 3/2004 | Hernblad | |
| 2004/0158494 | A1 | 8/2004 | Suthar | |
| 2004/0230489 | A1 | 11/2004 | Goldthwaite et al. | |
| 2004/0230526 | A1 | 11/2004 | Praisner | |
| 2004/0248548 | A1 | 12/2004 | Niwa et al. | |
| 2005/0065851 | A1* | 3/2005 | Aronoff | G06Q 50/12 705/15 |
| 2005/0071232 | A1* | 3/2005 | Frater | G06Q 20/04 705/16 |
| 2005/0108116 | A1* | 5/2005 | Dobson | G06Q 40/12 705/30 |
| 2005/0251440 | A1* | 11/2005 | Bednarek | G06Q 30/0207 705/7.32 |
| 2006/0111945 | A1 | 5/2006 | Tinsley et al. | |
| 2006/0143087 | A1* | 6/2006 | Tripp | G06Q 50/12 705/15 |
| 2006/0149665 | A1* | 7/2006 | Weksler | G06Q 40/025 705/38 |
| 2006/0229984 | A1 | 10/2006 | Miyuki | |
| 2006/0259311 | A1* | 11/2006 | Stadler | G06Q 30/02 705/1.1 |
| 2006/0282660 | A1 | 12/2006 | Varghese et al. | |
| 2006/0294025 | A1* | 12/2006 | Mengerink | G06Q 30/0239 705/77 |
| 2007/0174080 | A1 | 7/2007 | Outwater | |
| 2007/0244811 | A1 | 10/2007 | Tuminnaro | |
| 2008/0003977 | A1* | 1/2008 | Chakiris | G06Q 20/10 455/407 |
| 2008/0040265 | A1* | 2/2008 | Rackley, III | G06Q 20/32 705/40 |
| 2008/0071587 | A1* | 3/2008 | Granucci | G06Q 10/02 705/5 |
| 2008/0195428 | A1* | 8/2008 | O'Sullivan | G06Q 10/025 705/6 |
| 2008/0195664 | A1* | 8/2008 | Maharajh | H04L 67/306 |
| 2009/0024533 | A1 | 1/2009 | Fernandes et al. | |
| 2009/0037286 | A1* | 2/2009 | Foster | G06Q 20/202 705/21 |
| 2009/0141875 | A1* | 6/2009 | Demmitt | G10L 15/26 379/88.14 |
| 2009/0299869 | A1 | 12/2009 | Cibanof | |
| 2009/0307140 | A1* | 12/2009 | Mardikar | G06Q 20/3278 705/71 |
| 2009/0325606 | A1* | 12/2009 | Farris | H04W 4/021 455/456.3 |
| 2009/0327130 | A1* | 12/2009 | Labaton | G06Q 20/102 705/41 |
| 2010/0010906 | A1* | 1/2010 | Grecia | G06Q 20/405 705/21 |
| 2010/0030698 | A1* | 2/2010 | Goodin | G06Q 20/3821 705/76 |
| 2010/0069035 | A1 | 3/2010 | Johnson | |
| 2010/0082481 | A1 | 4/2010 | Lin et al. | |
| 2010/0082485 | A1* | 4/2010 | Lin | G06Q 30/0603 705/44 |
| 2010/0121745 | A1* | 5/2010 | Teckchandani | G06Q 20/10 705/30 |
| 2010/0131347 | A1* | 5/2010 | Sartipi | G06Q 20/32 705/14.33 |

(56) References Cited

U.S. PATENT DOCUMENTS

| | | | |
|---|---|---|---|
| 2010/0174647 A1* | 7/2010 | Kowalchyk | G06Q 20/12 705/44 |
| 2010/0191645 A1* | 7/2010 | Hougland | G06Q 20/10 705/39 |
| 2010/0280860 A1 | 11/2010 | Iskold et al. | |
| 2011/0047075 A1* | 2/2011 | Fourez | G06Q 20/40 705/44 |
| 2011/0071865 A1* | 3/2011 | Leeds | G06Q 10/025 705/6 |
| 2011/0106668 A1* | 5/2011 | Korosec | G06Q 20/12 705/30 |
| 2011/0106675 A1* | 5/2011 | Perlman | G06Q 20/14 705/30 |
| 2011/0112898 A1* | 5/2011 | White | G06Q 20/202 705/14.38 |
| 2011/0145049 A1 | 6/2011 | Hertel et al. | |
| 2011/0153495 A1* | 6/2011 | Dixon | G06Q 20/10 705/39 |
| 2011/0173060 A1* | 7/2011 | Gallagher | G06Q 30/0226 705/14.27 |
| 2011/0178883 A1 | 7/2011 | Granbery et al. | |
| 2011/0187664 A1* | 8/2011 | Rinehart | G06F 3/041 345/173 |
| 2011/0201306 A1* | 8/2011 | Ali Al-Harbi | G06Q 20/3223 455/411 |
| 2011/0238514 A1 | 9/2011 | Ramalingam et al. | |
| 2011/0238517 A1 | 9/2011 | Ramalingam et al. | |
| 2011/0251892 A1 | 10/2011 | Laracey | |
| 2011/0258058 A1* | 10/2011 | Carroll | G06Q 30/06 705/15 |
| 2011/0283188 A1 | 11/2011 | Farrenkopf et al. | |
| 2011/0307282 A1 | 12/2011 | Camp et al. | |
| 2011/0307547 A1* | 12/2011 | Backer | G06Q 10/1095 709/203 |
| 2011/0313867 A9* | 12/2011 | Silver | G06Q 10/02 705/15 |
| 2011/0313871 A1* | 12/2011 | Greenwood | G06Q 20/10 705/16 |
| 2011/0313880 A1* | 12/2011 | Paul | G06Q 30/0631 705/26.7 |
| 2012/0016696 A1* | 1/2012 | Lee | G06Q 30/0613 705/5 |
| 2012/0036754 A1 | 2/2012 | Van Bortel | |
| 2012/0084210 A1* | 4/2012 | Farahmand | G06Q 20/40 705/64 |
| 2012/0101942 A1* | 4/2012 | Park | G07B 15/02 705/40 |
| 2012/0115512 A1 | 5/2012 | Grainger et al. | |
| 2012/0130903 A1 | 5/2012 | Dorsey et al. | |
| 2012/0136754 A1 | 5/2012 | Underwood | |
| 2012/0143753 A1* | 6/2012 | Gonzalez | G06Q 20/12 705/41 |
| 2012/0150728 A1 | 6/2012 | Isaacson et al. | |
| 2012/0158553 A1 | 6/2012 | Sudhidhanakul et al. | |
| 2012/0166332 A1* | 6/2012 | Naaman | G06Q 20/3278 705/40 |
| 2012/0173350 A1* | 7/2012 | Robson | G06Q 30/0643 705/16 |
| 2012/0173396 A1* | 7/2012 | Melby | G06Q 30/04 705/34 |
| 2012/0185317 A1* | 7/2012 | Wong | G06Q 30/0222 705/14.23 |
| 2012/0185355 A1 | 7/2012 | Kilroy | |
| 2012/0209749 A1* | 8/2012 | Hammad | G06Q 20/20 705/27.1 |
| 2012/0215649 A1* | 8/2012 | De Judicibus | G06Q 20/425 705/21 |
| 2012/0246074 A1 | 9/2012 | Annamalai et al. | |
| 2012/0253852 A1* | 10/2012 | Pourfallah | G06Q 20/405 705/4 |
| 2012/0265676 A1 | 10/2012 | Gould et al. | |
| 2012/0278201 A1* | 11/2012 | Milne | G06Q 20/3224 705/26.41 |
| 2012/0290421 A1* | 11/2012 | Qawami | G06Q 20/3255 705/21 |
| 2012/0317018 A1* | 12/2012 | Barnett | G06Q 20/383 705/39 |
| 2012/0323642 A1* | 12/2012 | Camp | G06Q 10/06 705/13 |
| 2013/0006742 A1* | 1/2013 | Richard | G06Q 30/0224 705/14.25 |
| 2013/0006853 A1 | 1/2013 | Amundsen | |
| 2013/0018715 A1* | 1/2013 | Zhou | G06Q 20/3276 705/14.23 |
| 2013/0041824 A1* | 2/2013 | Gupta | G06Q 40/00 705/44 |
| 2013/0054454 A1* | 2/2013 | Purves | H04L 67/306 705/41 |
| 2013/0085877 A1* | 4/2013 | Ruhrig | G06Q 20/102 705/21 |
| 2013/0090959 A1* | 4/2013 | Kvamme | G06Q 10/02 705/5 |
| 2013/0124412 A1* | 5/2013 | Itwaru | G06Q 20/20 705/44 |
| 2013/0126599 A1* | 5/2013 | Soske | G06Q 30/0601 235/375 |
| 2013/0132274 A1 | 5/2013 | Henderson et al. | |
| 2013/0144731 A1* | 6/2013 | Baldwin | G06Q 20/204 705/17 |
| 2013/0151419 A1* | 6/2013 | Hitchcock | G06Q 30/06 705/75 |
| 2013/0179348 A1* | 7/2013 | Crofts | G06Q 20/322 705/44 |
| 2013/0185124 A1* | 7/2013 | Aaron | G07B 13/02 705/13 |
| 2013/0246220 A1 | 9/2013 | Hammad et al. | |
| 2013/0246301 A1* | 9/2013 | Radhakrishnan | G06Q 30/0282 705/347 |
| 2013/0254002 A1 | 9/2013 | Isaacson et al. | |
| 2013/0275186 A1* | 10/2013 | Olives | G06Q 10/0639 705/7.39 |
| 2013/0282412 A1* | 10/2013 | Dingler | H04L 67/18 705/5 |
| 2013/0282588 A1* | 10/2013 | Hruska | G06Q 20/40 705/67 |
| 2013/0290040 A1* | 10/2013 | Perry | G06Q 50/10 705/5 |
| 2013/0317893 A1 | 11/2013 | Nelson et al. | |
| 2013/0325663 A1 | 12/2013 | Scipioni et al. | |
| 2013/0339231 A1* | 12/2013 | Chaitanya | G06Q 20/28 705/41 |
| 2014/0006184 A1* | 1/2014 | Godsey | G06Q 20/3276 705/16 |
| 2014/0006194 A1* | 1/2014 | Xie | G06Q 20/326 705/21 |
| 2014/0006286 A1* | 1/2014 | Gerban | G06Q 20/40145 705/44 |
| 2014/0032295 A1* | 1/2014 | Cantrell | G06Q 30/0252 705/14.23 |
| 2014/0046845 A1* | 2/2014 | Dogin | G06Q 20/322 705/44 |
| 2014/0057648 A1* | 2/2014 | Lyman | H04W 4/022 455/456.1 |
| 2014/0070001 A1* | 3/2014 | Sanchez | G06Q 40/025 235/380 |
| 2014/0074691 A1 | 3/2014 | Bank et al. | |
| 2014/0089135 A1* | 3/2014 | Linh | G06Q 30/0643 705/26.7 |
| 2014/0100931 A1* | 4/2014 | Sanchez | G06Q 20/102 705/14.23 |
| 2014/0108247 A1* | 4/2014 | Artman | G06Q 20/20 705/44 |
| 2014/0156508 A1 | 6/2014 | Argue et al. | |
| 2014/0156517 A1* | 6/2014 | Argue | G06Q 20/209 705/40 |
| 2014/0164234 A1 | 6/2014 | Coffman et al. | |

(56) References Cited

U.S. PATENT DOCUMENTS

| | | | |
|---|---|---|---|
| 2014/0172727 A1* | 6/2014 | Abhyanker | G06Q 30/0645 705/307 |
| 2014/0180929 A1 | 6/2014 | Ohnishi et al. | |
| 2014/0181908 A1* | 6/2014 | Doris-Down | H04W 4/026 726/4 |
| 2014/0214652 A1* | 7/2014 | Zheng | G06Q 20/227 705/39 |
| 2014/0222595 A1* | 8/2014 | Fernandes | G06Q 20/20 705/16 |
| 2014/0222663 A1* | 8/2014 | Park | G06Q 20/20 705/39 |
| 2014/0229301 A1* | 8/2014 | Wu | G06Q 30/0635 705/15 |
| 2014/0229560 A1* | 8/2014 | Gray | G06Q 10/1095 709/206 |
| 2014/0279085 A1* | 9/2014 | Ahmad | G06Q 30/0641 705/15 |
| 2014/0279098 A1 | 9/2014 | Ham | |
| 2014/0279123 A1* | 9/2014 | Harkey | G06Q 50/10 705/26.1 |
| 2014/0310030 A1* | 10/2014 | Cheranda | G06Q 10/02 705/5 |
| 2014/0310117 A1* | 10/2014 | Moshal | G06Q 20/3255 705/23 |
| 2014/0330654 A1* | 11/2014 | Turney | G06Q 20/3224 705/15 |
| 2014/0330656 A1* | 11/2014 | Zhou | H04W 12/06 705/16 |
| 2014/0330713 A1* | 11/2014 | Isaacson | G06Q 20/24 705/41 |
| 2014/0351130 A1 | 11/2014 | Cheek et al. | |
| 2014/0351132 A1* | 11/2014 | Wieler | G06Q 20/40 705/44 |
| 2014/0358766 A1* | 12/2014 | Nayyar | G06Q 40/025 705/38 |
| 2014/0365249 A1* | 12/2014 | Ditoro | G06Q 50/12 705/5 |
| 2015/0012341 A1* | 1/2015 | Amin | G01C 21/3438 705/13 |
| 2015/0026058 A1* | 1/2015 | Smith | G06Q 20/32 705/42 |
| 2015/0066742 A1* | 3/2015 | Chatterton | H04W 4/023 705/39 |
| 2015/0066746 A1* | 3/2015 | Nichols | G06Q 20/3265 705/39 |
| 2015/0073980 A1* | 3/2015 | Griffin | G06Q 30/00 705/39 |
| 2015/0094080 A1* | 4/2015 | Bleecher Snyder | H04W 4/02 455/456.1 |
| 2015/0120504 A1* | 4/2015 | Todasco | G06Q 20/322 705/26.61 |
| 2015/0127394 A1* | 5/2015 | Hogan | G06Q 50/12 705/5 |
| 2015/0199776 A1* | 7/2015 | Gluck | G06Q 30/0201 705/15 |
| 2015/0242764 A1* | 8/2015 | Subbaraj | G06Q 10/02 705/5 |
| 2015/0278830 A1* | 10/2015 | Zamer | G07C 9/00904 705/7.29 |
| 2015/0339655 A1 | 11/2015 | Basheerahammed et al. | |
| 2015/0348001 A1* | 12/2015 | Van Os | G06Q 20/3278 705/44 |
| 2015/0348003 A1 | 12/2015 | Reader | |
| 2016/0054428 A1* | 2/2016 | Eldic | H04W 64/00 455/574 |
| 2016/0171584 A1* | 6/2016 | Cao | G06Q 30/0282 705/26.62 |
| 2016/0210606 A1* | 7/2016 | Henderson | G06Q 20/40 |
| 2016/0244311 A1* | 8/2016 | Burks | B67D 1/0858 |
| 2016/0277560 A1* | 9/2016 | Gruberman | G06Q 20/3221 |
| 2016/0337373 A1* | 11/2016 | Tseng | H04W 88/08 |
| 2017/0103677 A1* | 4/2017 | Bhattacharjee | G16H 20/60 |
| 2017/0109843 A1* | 4/2017 | Berg | G06Q 20/326 |
| 2019/0066191 A1* | 2/2019 | Bansal | G06Q 20/102 |
| 2019/0197514 A1* | 6/2019 | Tineo | H04W 4/08 |
| 2020/0104822 A1* | 4/2020 | Govindarajan | G06Q 20/327 |
| 2020/0342429 A1* | 10/2020 | Ba | G06Q 20/14 |
| 2021/0174338 A1* | 6/2021 | Isaacson | G06Q 20/10 |

OTHER PUBLICATIONS

"Advance Dining Reservations—How to make them", published by www.themouseforless.com on Aug. 16, 2013, pp. 1-2.

"Bluetooth Low Energy (BLE) 101: A Technology Primer with Example Use Cases," A Smart Card Alliance Mobile and NFC Council White Paper, dated Jun. 2014, pp. 1-32.

"Divvy makes splitting the check as easy as snap, drag, and pay," Divvy App Website, published May 11, 2013, Retrieved from Internet URL: http://web.archive.org/web/20130511015727/http://divvythatup.com/, on Sep. 6, 2017, pp. 1-2.

"Tab: A Seriously Useful Bill-Splitting App," The Huffington Post, published Aug. 27, 2013, Retrieved from Internet URL: http://www.huffingtonpost.com/2013/08/27/bill-splitting-app-tab_n_3818225.html>, on Sep. 6, 2017, pp. 1-2.

"White Paper Near Field Communication" NOKIA, 2007, pp. 1-8.

Non-Final Office Action dated May 29, 2012, for U.S. Appl. No. 13/192,147, of Dorsey, J., et al., filed Jul. 27, 2011.

Non-Final Office Action dated Feb. 13, 2013, for U.S. Appl. No. 13/192,147, of Dorsey, J., et al., filed Jul. 27, 2011.

Non-Final Office Action dated Jun. 11, 2013, for U.S. Appl. No. 13/649,603, of Kumar, A., filed Oct. 11, 2012.

Notice of Allowance dated Aug. 19, 2013, for U.S. Appl. No. 13/192,147, of Dorsey, J., et al., filed Jul. 27, 2011.

Final Office Action dated Dec. 5, 2013, for U.S. Appl. No. 13/649,603, of Kumar, A., filed Oct. 11, 2012.

Non-Final Office Action dated Oct. 14, 2014, for U.S. Appl. No. 13/925,683, of Clark, C., et al., filed Jun. 24, 2013.

Non-Final Office Action dated Nov. 6, 2014, for U.S. Appl. No. 14/229,654, of Rose, C., filed Mar. 28, 2014.

Non-Final Office Action dated Jan. 5, 2015, for U.S. Appl. No. 14/219,974, of Rose, C., filed Mar. 19, 2014.

Non-Final Office Action dated Jan. 28, 2015, for U.S. Appl. No. 13/649,603, of Kumar, A., filed Oct. 11, 2012.

Final Office Action dated May 13, 2015, for U.S. Appl. No. 13/925,683, of Clark, C., et al., filed Jun. 24, 2013.

Final Office Action dated May 22, 2015, for U.S. Appl. No. 14/229,654, of Rose, C., filed Mar. 28, 2014.

Final Office Action dated Jun. 19, 2015, for U.S. Appl. No. 14/219,974, of Rose, C., filed Mar. 19, 2014.

Non-Final Office Action dated Aug. 26, 2015, for U.S. Appl. No. 14/140,212, of Chin, A., et al., filed Dec. 24, 2013.

Final Office Action dated Oct. 16, 2015, for U.S. Appl. No. 13/649,603, of Kumar, A., filed Oct. 11, 2012.

Non-Final Office Action dated Nov. 17, 2015, for U.S. Appl. No. 13/925,683, of Clark, C., et al., filed Jun. 24, 2013.

Advisory Action dated Dec. 14, 2015, for U.S. Appl. No. 13/649,603, of Kumar, A., filed Oct. 11, 2012.

Non-Final Office Action dated Jan. 6, 2016, for U.S. Appl. No. 14/219,974, of Rose, C., filed Mar. 19, 2014.

Non-Final Office Action dated Jan. 20, 2016, for U.S. Appl. No. 14/229,654, of Rose, C., filed Mar. 28, 2014.

Non-Final Office Action dated Feb. 25, 2016, for U.S. Appl. No. 13/649,603, of Kumar, A., filed Oct. 11, 2012.

Final Office Action dated May 19, 2016, for U.S. Appl. No. 13/925,683, of Clark, C., et al. filed Jun. 24, 2013.

Final Office Action dated Jun. 30, 2016, for U.S. Appl. No. 14/229,654, of Rose, C., filed Mar. 28, 2014.

Final Office Action dated Jul. 11, 2016, for U.S. Appl. No. 14/219,974, of Rose, C., filed Mar. 19, 2014.

Final Office Action dated Jul. 21, 2016, for U.S. Appl. No. 13/649,603, of Kumar, A., filed Oct. 11, 2012.

Non-Final Office Action dated Oct. 18, 2016, for U.S. Appl. No. 13/925,683, of Clark, C., et al., filed Jun. 24, 2013.

Notice of Allowance dated Jan. 26, 2017, for U.S. Appl. No. 13/649,603, of Kumar, A., filed Oct. 11, 2012.

(56) References Cited

OTHER PUBLICATIONS

Non-Final Office Action dated Feb. 10, 2017, for U.S. Appl. No. 14/569,451, of Abrams, Z.C., et al., filed Dec. 12, 2014.
Non-Final Office Action dated Feb. 22, 2017, for U.S. Appl. No. 14/229,654, of Rose, C., filed Mar. 28, 2014.
Notice of Allowance dated Mar. 22, 2017, for U.S. Appl. No. 14/219,974, of Rose, C., filed Mar. 19, 2014.
Non-Final Office Action dated Apr. 10, 2017, for U.S. Appl. No. 14/462,430, of Lamba, K.S., et al., filed Aug. 18, 2014.
Final Office Action dated May 18, 2017, for U.S. Appl. No. 13/925,683, of Clark, C., et al., filed Jun. 24, 2013.
Final Office Action dated Aug. 10, 2017, for U.S. Appl. No. 14/229,654, of Rose, C., filed Mar. 28, 2014.
Final Office Action dated Aug. 25, 2017, for U.S. Appl. No. 14/569,451, of Abrams, Z.C., et al., filed Dec. 12, 2014.
Notice of Allowance dated Sep. 13, 2017, for U.S. Appl. No. 14/140,212, of Chin, A., et al., filed Dec. 24, 2013.
Advisory Action dated Nov. 1, 2017, for U.S. Appl. No. 14/229,654, of Rose, C., filed Mar. 28, 2014.
Final Rejection dated Dec. 14, 2017, for U.S. Appl. No. 14/462,430, of Lamba, K.S., et al., filed Aug. 18, 2014.
Notice of Allowance dated Feb. 6, 2018, for U.S. Appl. No. 14/229,654, of Rose, C., filed Mar. 28, 2014.
Non-Final Office Action dated Feb. 9, 2018, for U.S. Appl. No. 14/569,451, of Abrams, Z.C., et al., filed Dec. 12, 2014.
Examiner's Answer to Appeal Brief dated May 4, 2018, for U.S. Appl. No. 13/925,683, of Clark, C., et al., filed Jun. 24, 2013.
Non-Final Rejection dated Jun. 29, 2018, for U.S. Appl. No. 14/462,430, of Lamba, K.S., et al., filed Aug. 18, 2014.
Final Office Action dated Aug. 10, 2018, for U.S. Appl. No. 14/569,451, of Abrams, Z.C., et al., filed Dec. 12, 2014.
International Search Report and Written Opinion for International Patent Application No. PCT/US2014/062700, dated Feb. 10, 2015.
Final Office Action dated Jan. 10, 2020, for U.S. Appl. No. 14/462,430, of Lamba, K.S., et al., filed Aug. 18, 2014.
Final Office Action dated Feb. 26, 2020, for U.S. Appl. No. 15/607,068, of Kumar, A.R., filed May 26, 2017.
Advisory Action dated May 9, 2019, for U.S. Appl. No. 14/462,430, of Lamba, K.S., et al., filed Aug. 18, 2014.
Non-Final Rejection dated Jun. 14, 2019, for U.S. Appl. No. 14/569,451, of Abrams, Z.C., et al., filed Dec. 12, 2014.
Advisory Action dated Apr. 21, 2020, for U.S. Appl. No. 14/462,430, of Lamba, K.S., et al., filed Aug. 18, 2014.
Final Office Action dated May 15, 2020, for U.S. Appl. No. 14/569,451, of Abrams, Z.C., et al., filed Dec. 12, 2014.
"Billr: Bill Splitting at the Table," Billr, iTunes Preview, Retrieved from the internet URL: https://itunes.apple.com/us/app/billr-bill-splitting-attable/id501889312?ls=1&mt=8, on Nov. 4, 2014, pp. 1-2.
"Divvy on the App Store on iTunes," iTunes, Helix Interactive, Retrieved from the internet URL: https://itunes.apple.com/us/app/divvy/id560503890?ls= 1 &mt=8, on Nov. 4, 2014, pp. 1-2.
"Sharing bills & expenses?," WeSplit.It., Retrieved from the internet URL : https://wesplit.it/, on Nov. 4, 2014, pp. 1-2.
"Split bills, share rent & expenses for your sharehouse or holiday, The best way to split bills," dapShare, Retrieved from the internet: URL<http://dapshare.com/, on Nov. 4, 2014, pp. 1-2.
"Split expenses with friends," Splitwise, Retrieved from the internet URL: https://www.splitwise.com/, on Nov. 4, 2014, pp. 1-2.
"Splitabill," Funkbit AS, iTunes Preview, dated Oct. 15, 2012, Retrieved from the internet URL: https://itunes.apple.com/us/app/splitabill/id485048203, on Nov. 4, 2014, pp. 1-2.
"Splitabill.com: Take a tour," Splitabill, Retrieved from the internet URL: https://splitabill.com/tour/, on Nov. 4, 2014, pp. 1-2.
"Splitwise," Google Play, dated Oct. 15, 2014, Retrieved from the internet URL: ttps://play.google.com/store/aoos/details?id=com.Splitwise.SplitwiseMobile, on Nov. 4, 2014, pp. 1-2.
"The quickest way to split a bill and calculate the tip at restaurants and bars," Billr.me, Retrieved from the Internet URL: http://billr.me/, on Oct. 29, 2015, pp. 1-4.
"What is Divvy?," Divvy That Up, dated Sep. 17, 2013, Retrieved from the internet URL: http://www.divvythatup.com/, on Nov. 4, 2014, pp. 1-5.
Dodd, A., "dapShare Mobile—Andriod Apps on Google Play," dated Nov. 23, 2011, Retrieved from the internet URL: https://play.google.com/store/apps/details?id=com.dapshare&h1=en, on Nov. 4, 2014, pp. 1-2.
"Goode, L., ""Paying With Square's New Mobile-Payments App,""" All Things D, dated Apr. 30, 2012, Retrieved from the InternetURL: http://allthingsd.com/20120430/paying-with-squares-new-mobile-payments-app/, on Nov. 7, 2014, pp. 1-3".
Advisory Action dated Oct. 24, 2018, for U.S. Appl. No. 14/569,451 of Abrams, Z.C., filed Dec. 12, 2014.
Final Office Action dated Feb. 25, 2019, for U.S. Appl. No. 14/462,430 Lamba, K. S., filed Aug. 18, 2014.
Non-Final Rejection dated Aug. 21, 2019, for U.S. Appl. No. 14/462,430, of Lamba, K.S., et al., filed Aug. 18, 2014.
Non-Final Rejection dated Sep. 27, 2019, for U.S. Appl. No. 15/607,068, of Kumar, A.R., filed May 26, 2017.
Non-Final Office Action dated Nov. 7, 2019, for U.S. Appl. No. 14/569,451, of Abrams, Z.C., et al., filed Dec. 12, 2014.
Non-Final Office Action dated Sep. 16, 2020, for U.S. Appl. No. 15/607,068, of Kumar, A.R., filed May 26, 2017.
Notice of Allowance dated Jan. 26, 2021, for U.S. Appl. No. 15/607,068, of Kumar, A.R., filed May 26, 2017.

* cited by examiner

AUTOMATIC BILLING PAYMENT SYSTEM

CROSS-REFERENCE TO RELATED APPLICATIONS

This application is a continuation of U.S. Non-provisional patent application Ser. No. 14/229,654, filed Mar. 28, 2014, entitled "APPORTIONING SHARED FINANCIAL EXPENSES" which is a continuation of U.S. Non-provisional patent application Ser. No. 14/219,974, filed Mar. 19, 2014, entitled "APPORTIONING SHARED FINANCIAL EXPENSES," which claims the benefit of U.S. Provisional Patent Application No. 61/896,618, entitled "RESERVATION AND WAITLIST MANAGEMENT", filed on Oct. 28, 2013, each of which are hereby expressly incorporated herein by reference in their entireties.

BACKGROUND

People often dine together at restaurants in groups. When dining together, a group of people may receive a shared bill from the restaurant that specifies a total amount due as determined based on all of the items that were collectively ordered by the group. Typically, the group will split the bill, for example, by each contributing some amount of cash or providing a credit card to be charged. In some instances, the restaurant may be limited in number of credit cards that it can process, which can complicate the group's efforts to split the bill.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to apportioning, e.g., splitting, a bill among a group of users. In particular, various embodiments of the present disclosure can provide methods for identifying users with whom a bill will be split and methods for confirming whether an identified user will contribute funds to the bill and in what amount.

A host user can interact with a system to create an electronic reservation, enroll in a waitlist, or create a purchase order. When creating the electronic reservation, enrolling in the waitlist, or creating the purchase order, the host user can identify one or more other users that are going to participate in the reservation, waitlist, or purchase order. For example, the host user can create a reservation for two people and identify the two people, for example, by selecting the two people from a list of contacts on the host user's phone. In some instances, data that describes such electronic reservations, waitlists, or purchase orders can be used to simplify the apportioning, e.g., splitting, of an electronic bill.

For example, an electronic reservation can identify a group of users that will be dining together at a particular restaurant. Each user in the group may order one or more items from the restaurant menu. When it's time to pay the bill, each user device of a user in the group of users can be sent an electronic bill for the total amount due. For example, the point-of-sale can determine which user devices to send the electronic bill based on the users that were identified in the electronic reservation.

Once the electronic bill is received, a user in the group of users, e.g., the host user that created the electronic reservation, can select an option to apportion the total amount due among other users in the group. In response, a new electronic bill for an apportioned amount can be generated and sent to the user devices for each user in the group. Each user can review the new electronic bill for the apportioned amount, for example, using their respective user devices, and can pay the electronic bill through a card-less payment transaction.

Using electronic reservations, waitlists, and purchase orders to identify users that are involved in shared financial expense can simplify the process of identifying who participated in a shared financial expense. Further, allowing apportioning of electronic bills can allow more users to pay for their portion of the bill using card-less payment transactions.

Other advantages, variations, and functions are described and suggested below as may be provided in accordance with the various embodiments.

Figure 1:
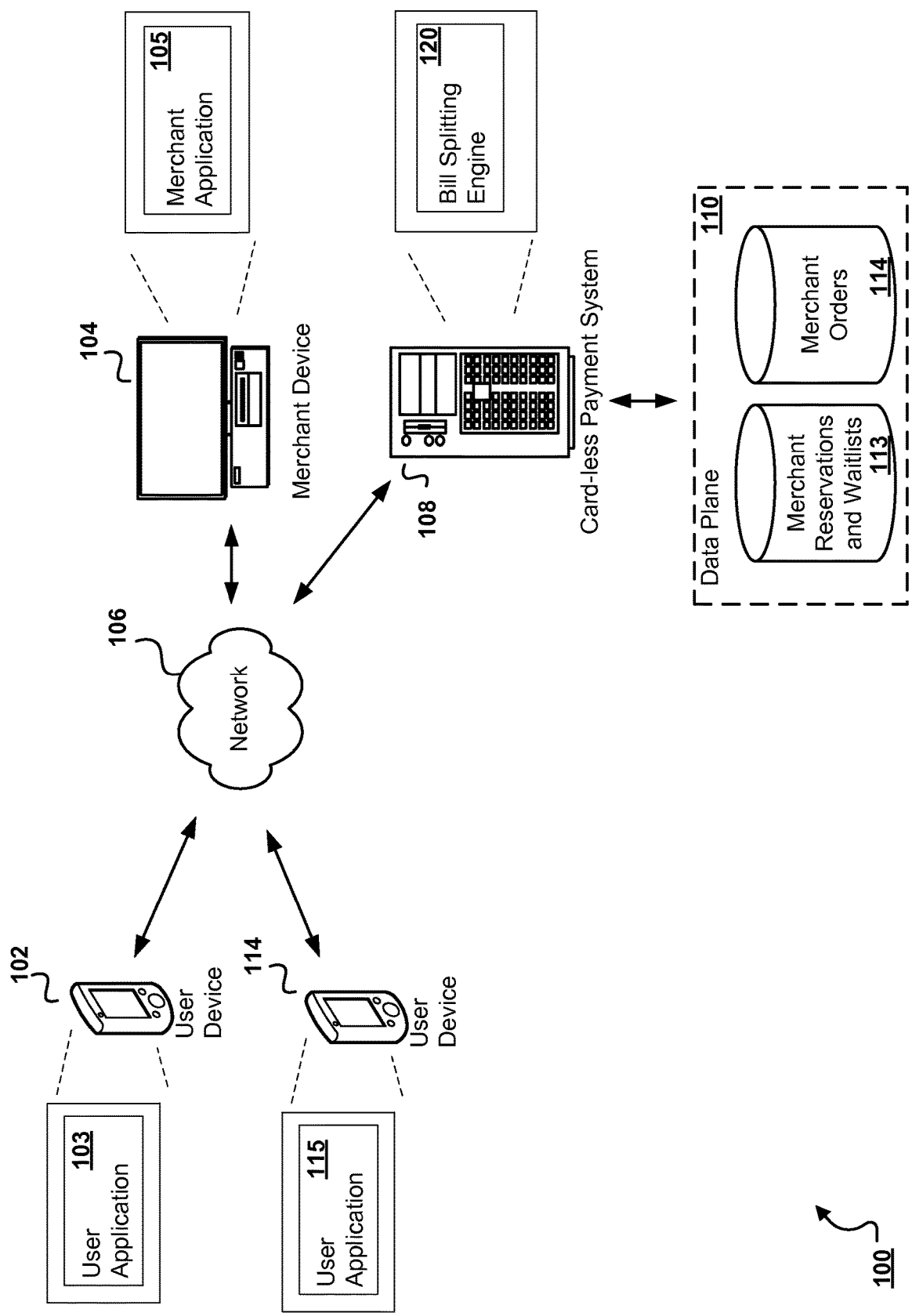
FIG. 1 illustrates an example of an environment for implementing aspects in accordance with various embodiments.

FIG. 1 illustrates an example of an environment 100 for implementing aspects in accordance with various embodiments. The example environment 100 includes a card-less payment system 108. The card-less payment system 108 is configured to process card-less payment transactions, as described below in reference to FIG. 6. The card-less payment system 108 can be implemented as computer programs on one or more computers in one or more locations, in which the systems, components, and techniques described below can be implemented.

Users, e.g., customers, can interact with the card-less payment system 108 to perform card-less payment transactions with merchants, as described below in reference to FIG. 6. For example, a user can interact with a software application, e.g., a user application 103, running on the user device 102 to pay for items purchased from a merchant through a card-less payment transaction. The user devices 102 and 114 can each be a computer coupled to the card-less payment system 108 through a data communication network 106, e.g., the Internet. The user devices 102 and 114 generally each include a memory, e.g., a random access memory (RAM), for storing instructions and data, and a processor for executing stored instructions. The user devices 102 and 114 can each include one or more components, e.g., software or hardware, that are configured to determine a geographic location of the user device 102 using, for example, various geolocation techniques, e.g., a global positioning system (GPS). Further, the user devices 102 and 114 can each be any appropriate device operable to send and receive requests, messages, or other types of information over the network 106. Some examples of user devices include personal computers, cellular phones, handheld messaging devices, laptop computers, personal data assistants, tablet devices, and the like.

The network 106 can include any appropriate network, including an intranet, the Internet, a cellular network, a local area network, a wide area network, or any other such network, or combination thereof. Components used for such a system can depend at least in part upon the type of network, the environment selected, or both. Protocols and components for communicating over such a network are well known and will not be discussed herein in detail. The merchant device 104 and the user device 102 can communicate over the network using wired or wireless connections, and combinations thereof.

As described below in reference to FIG. 6, users conducting card-less payment transactions with merchants through the card-less payment system 108 will each have a respective user account with the card-less payment system 108. Similarly, each merchant entering into card-less payment transactions with users will have a respective merchant account with the card-less payment system 108.

Before conducting a card-less payment transaction, a user can interact with a user application, e.g., the user application 103 running on the user device 102, to "check in" with the particular merchant. By checking in with the particular merchant, the user has not necessarily consented to a card-less payment transaction. Rather, the user has simply made the merchant aware that the user is available for entering into a card-less payment transaction with the merchant. The card-less payment transaction can be performed when the user interacts with the merchant at a point-of-sale of the merchant, as described below in reference to FIG. 6.

In some instances, users may want to apportion, e.g., split, a shared financial expense that was incurred among two or more users. For example, a first and second user may be dining together at a restaurant and may want to split a shared bill for expenses that were incurred by the first and second user during the meal. To address such a situation, in some embodiments, the card-less payment system 108 includes a bill splitting engine 120 that is configured to apportion, e.g., split, among two or more users, a shared financial expense that was incurred by the two or more users for items that were purchased from a particular merchant.

For example, a restaurant may interact with a merchant application 105 to send, to a user device 102 of the first user and a user device 103 of the second user, an electronic receipt, e.g., a bill of charges, for a shared financial expense that was incurred by the first and second users at the restaurant. The first user can interact with the user device 102 to request apportionment of the electronic receipt and, in response, can be sent a new electronic bill that divides the total sum among the two users.

Generally, to apportion an electronic receipt, a merchant may ask users that were present during the shared financial expense, e.g., group dinner, for identification. Then, once these users are identified, the merchant can send each of these users an electronic receipt which the users can then apportion, as described above. This process can be cumbersome for both the merchant and the people involved in the shared financial expense.

To simplify this process, the merchant can determine which people were present during a shared financial expense based on data describing an electronic reservation, waitlist, or purchase order. For example, a user can interact with a system e.g., the card-less payment system 108, to create an electronic reservation with a merchant that identifies a group of people that will participate in the reservation. Similarly, the user can enroll in an electronic waitlist for a merchant that identifies a group of people that will participate in the reservation. In another example, the user can create an electronic purchase order for items on sale by a merchant and can identify a group of people that are participating in apportioning the cost of the purchase order. Thus, each electronic reservation, waitlist, or purchase order can identify a group of people, e.g., two or more people, and a merchant, that will be involved in the shared financial transaction.

A database, e.g., the merchant reservations and waitlists database 113 and the merchant order database 114, can store data describing electronic reservations and waitlists, and electronic purchase orders, respectively, that were created by users. The database can include, for each electronic reservation, waitlist, or purchase order, data describing a merchant name and references to one or more users that are participating in the respective reservation, waitlist, or purchase order. Further, the data may describe, for each user, a respective user account of the user with the card-less payment system 108, the user's contact information, e.g., e-mail or mobile phone number, or both.

When a user that created an electronic reservation, enrolled in a waitlist, or created a purchase order, checks into a merchant's location, the merchant is able to obtain details for that electronic reservation, waitlist, or purchase order. For example, when a user checks in with a merchant, for example, by interacting with the user application 103, the merchant is able to access information relating to the user through a display screen on the merchant device 104. That is, the merchant can determine if that user has created any electronic reservations, enrolled in waitlists, or created purchase orders that involve the merchant. The merchant can also identify any other users that were identified by the user as being part of a reservation, waitlist, or purchase order.

Thus, for example, once a user that created an electronic reservation for a merchant's restaurant has checked in, an electronic receipt can be generated based on which people were identified by the user for that electronic reservation. This electronic receipt can be sent to respective user devices for each of the people identified in the electronic reservation. If the user decides to apportion the total amount due in the electronic receipt, the card-less payment system 108 can split the total amount among the user and the people that were identified by the user for the electronic reservation.

While an electronic reservation, waitlist, or purchase order may identify multiple people, there may be instances in which only some of the identified people want to contribute to a bill. For example, person A may create an electronic reservation that identifies persons B, C, and D. In this example, the card-less payment system 108 may send an electronic receipt to respective user devices for each person A, B, C, and D. However, it may be the case that only persons A and C want to contribute to the shared financial expense incurred between the persons A, B, C, and D.

To address this scenario, in some embodiments, users can opt to participate in apportioning a shared financial expense by checking in with the merchant using their own user device. In some embodiments, users can opt to participate in apportioning a shared financial expense by being checked in with the merchant by some entity, e.g., another user or a merchant. In some embodiments, users that are not checked in with merchant, but were included in a electronic reservation, waitlist, or purchase order, are sent an electronic message from the card-less payment system 108 to confirm whether or not the user wants to participate in apportioning a shared financial expense. Users that confirm participation in the apportionment can be sent a respective electronic bill for their apportioned amount due and can pay for the bill using the methods described in this specification.

There are other ways to identify users with whom a shared expense will be apportioned. In some embodiments, a user, e.g., the host user, can interact with a user application, e.g., the user application 103, to identify one or more other users with whom the shared financial expense will be apportioned. For example, in some embodiments, the host user can identify another user through a list of contacts that stored on a user device, e.g., the user device 102, of the first user. Similarly, a user can add or remove users from an existing reservation, waitlist, or purchase order to modify the group of users that are considered for apportionment.

In some embodiments, a user that was identified for apportionment using the techniques described above, e.g., from a reservation, waitlist, or purchase order, is automatically identified, e.g., "checked in," for apportionment of a shared financial expense when a user device of the user is geographically located with a specified geofence. The specified geofence can be, for example, a geofence that defines the perimeter of the merchant's geographic location. In some embodiments, a merchant can identify, e.g., "check in," users to be included in apportioning a shared financial expense.

In some instances, in lieu of the electronic receipt, the merchant may provide the first user with a hardcopy of the receipt for the shared financial expense. In some embodiments, the hardcopy of the receipt includes a machine-readable code, e.g., a bar code or a QR code. In some embodiments, the first user can scan, using the user device 102 and through the user application 103, the machine-readable code to obtain an electronic copy of the receipt.

After the electronic receipt is communicated to the user device 102, the first user can interact with the user application 103 to view and pay for the shared financial expense. In some embodiments, the first user can interact with the user application 103 to select an apportionment option for the shared financial expense to apportion the expense with other users, e.g., the second user. In response to selecting the apportionment option, the bill splitting engine 120 can generate, for each user, a respective bill for an apportioned amount due for the shared financial expense.

For example, the bill splitting engine 120 can generate an apportioned amount due by dividing the total amount due for a shared financial expense by the number of users participating in the apportionment. The card-less payment system 108 can communicate, to a respective user device of each user, e.g., the user device 102 and the user device 114, data describing a respective electronic bill for the apportioned amount due. Once the data describing a respective bill is received by a user device, a user can interact with a user application running on the user device to authorize a card-less payment transaction through the user's account with the card-less payment system 108. The user can optionally add a tip amount to the respective bill, for example, by specifying a numerical tip amount or a tip percentage based on the respective apportioned amount due. For example, after respective electronic bills are generated, the card-less payment system 108 can communicate with the user device 114 to provide the second user with an electronic bill for the apportioned amount. The card-less payment system 108 can also verify that the second user wants to participate in the apportionment of the shared financial expense by requesting, from the second user, authorization to perform a card-less payment transaction using the second user's account. Authorization can be obtained by simply communicating an electronic message to a user device of the user and receiving a confirmation message from the user device.

In some embodiments, users that are participating in an electronic reservation, waitlist, purchase order, or users that are identified by the first user, are automatically billed for their respective bills for their apportioned amounts due upon exiting a geofence, e.g., a geofence that defines the perimeter of the merchant.

In some embodiments, when a user does not have a user account with the card-less payment system 108, the card-less payment system 108 communicates, to a user device belonging to the user, a hyperlink for downloading software, e.g., a user application 115, that allows the user to create a user account with the card-less payment system 108. For example, if the second user does not have a user account with the card-less payment system 108, then the card-less payment system 108 can communicate, to the user device 114 and through, for example, an e-mail or text message, a hyperlink for downloading software that allows the user to create a user account with the card-less payment system 108. The card-less payment system 108 can obtain the user's contact information by using the data stored in the merchant reservations and waitlists database 113 or the merchant orders database 114, as described above.

The shared financial expense does not necessarily need to be apportioned equally among users. For example, in some embodiments, a user can contribute for their portion of the shared financial expense by selecting one or more items that were purchased in the shared financial expense. In response to selecting the one or more items, the user can receive an electronic bill for an apportioned amount for the selected items. For example, the second user can interact with the user application 115 to select one or more items that participated in the shared financial expense. The user device 114 can communicate data describing the selected items to the card-less payment system 108 and the bill splitting engine 120 can generate, for the second user, an electronic bill for expenses that were incurred for the selected items, and can generate an electronic bill for the first user for the remaining expenses in the shared financial expense.

In some embodiments, the card-less payment system 108 is configured to aggregate data describing users including, for example, how often a user has visited a particular restaurant, the user's dining preferences, e.g., food and drink preferences, and dietary restrictions. This information can be provided to merchants, e.g., through a server's mobile device, when the user checks in.

FIG. 1 describes the bill splitting engine 120 performing operations using the card-less payment system 108. However, other implementations are possible where the bill splitting engine 120 is configured to perform operations using a user device, e.g., the user device 102, or a merchant device, e.g., the merchant device 104.

The merchant device 104 can be a computer coupled to the card-less payment system 108 through a data communication network 106, e.g., the Internet. The merchant device 104 generally includes a memory, e.g., a random access memory (RAM), for storing instructions and data, and a processor for executing stored instructions. The merchant device 104 can be any appropriate device operable to send and receive requests, messages, or other types of information over the network 106. The merchant device 104 can also include a display screen though which a merchant interacting with the merchant device 104 can view information, e.g., information describing orders that were received from customers. Some examples of merchant devices include point-of-sale systems, personal computers, cellular phones, handheld messaging devices, laptop computers, personal data assistants, tablet devices, and the like.

The data plane 110 includes one or more resources, servers, hosts, instances, routers, switches, data stores, other similar components, or a combination thereof. The resources of the data plane 110 are not limited to storing and providing access to data. Indeed, there may be several map servers, layers, or other elements, processes, or components, which may be chained or otherwise configured, and which can interact to perform tasks including, for example, obtaining data from an appropriate data store. As used in this specification, the term "data store" refers to any device or combination of devices capable of storing, accessing, and retrieving data, which may include any combination and number of data servers, databases, data storage devices, and data storage media, in any standard, distributed, or clustered environment.

The data stores of the data plane 110 can include several separate data tables, databases, or other data storage mechanisms and media for storing data relating to a particular aspect. For example, the data plane 110 illustrated includes mechanisms for storing merchant reservations and waitlists 113 and merchant purchase orders 114, which can be used to serve content. The data plane 110 is operable, through logic associated therewith, to receive instructions from the ordering system 107 and to obtain, update, or otherwise process data, instructions, or other such information in response thereto, as described above.

Each server typically includes an operating system that provides executable program instructions for the general administration and operation of that server, and typically will include a computer-readable medium storing instructions that, when executed by a processor of the server, enable the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment including several computer systems and components that are interconnected through one or more communication links, using one or more computer networks or direct connections. However, the system described above can be configured to operate equally well using fewer or a greater number of components than are illustrated in FIG. 1. Thus, the system 100 in FIG. 1 is provided merely as one example, and does not limit the scope of the disclosure.

Figure 2:
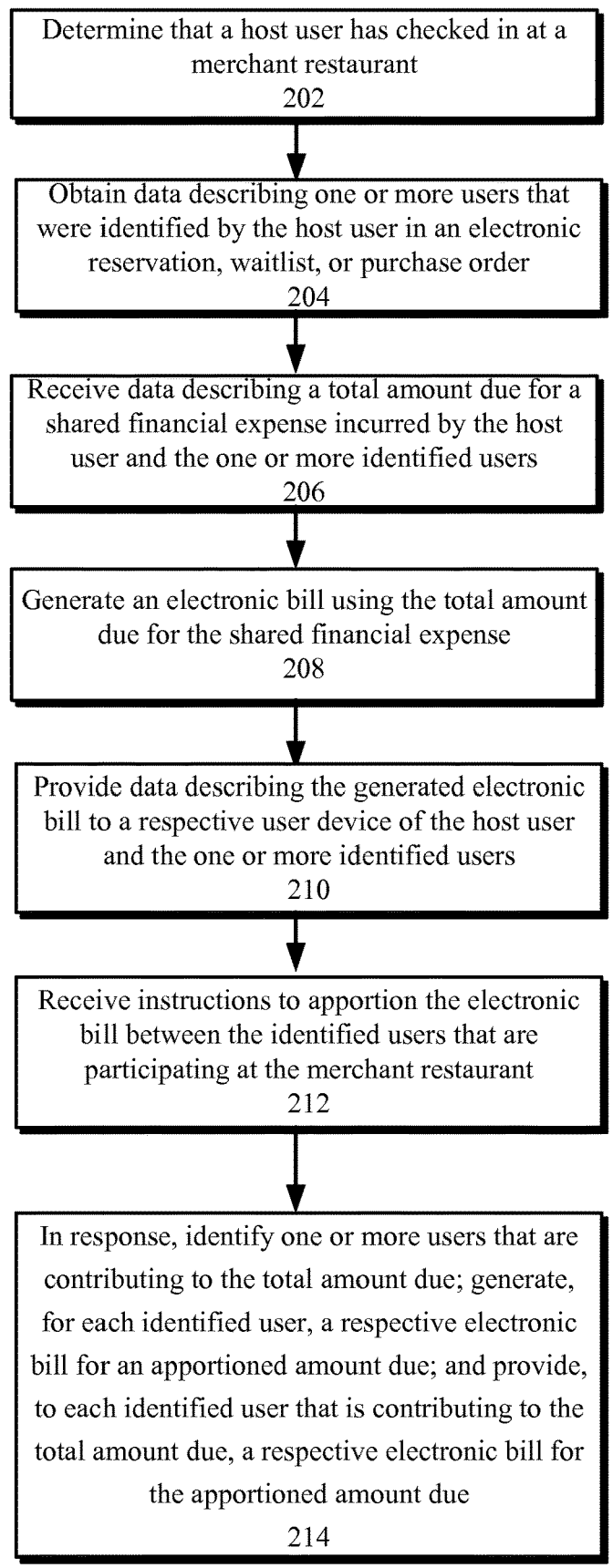
FIG. 2 is a flow diagram of an example process for apportioning an electronic bill among users.

FIG. 2 is a flow diagram of an example process 200 for apportioning an electronic bill among a group of users. The example process 200 is provided merely as an example and additional or fewer steps may be performed in similar or alternative orders, or in parallel, within the scope of the various embodiments described in this specification.

A computing device determines that a host user has checked in at a merchant restaurant 202. The computing device obtains data describing one or more users that were identified by the host user in an electronic reservation, waitlist, or purchase order 204. The computing device receives data describing a total amount due for a shared financial expense incurred by the host user and the one or more identified users 206. The computing device generates an electronic bill using the total amount due for the shared financial expense 208. The computing device provides data describing the generated electronic bill to a respective user device of the host user and the one or more identified users 210.

The computing device receives instructions to apportion the electronic bill between the host user and the one or more identified users 212. In response, the computing device, identifies one or more users that are contributing to the total amount due for the shared financial expense; generates for each identified user that is contributing to the total amount due, a respective electronic bill for an apportioned amount due for the shared financial expense; and provides, to each identified user that is contributing to the total amount due, a respective electronic bill for the apportioned amount due for the shared financial expense.

Figure 3:
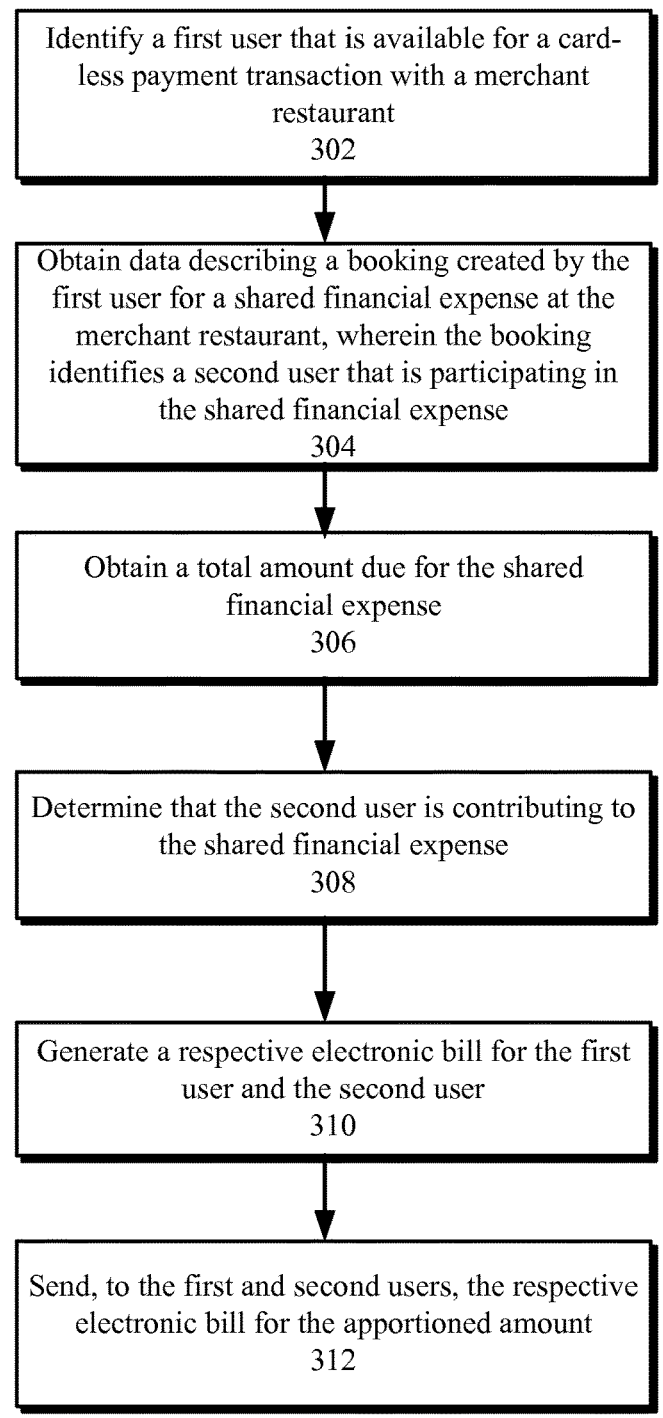
FIG. 3 is a flow diagram of another example process for apportioning an electronic bill among a group of users.

FIG. 3 is a flow diagram of an example process 300 for requesting apportioning of an electronic bill among a group of users. The example process 300 is provided merely as an example and additional or fewer steps may be performed in similar or alternative orders, or in parallel, within the scope of the various embodiments described in this specification. A computing device identifies a first user that is available for a card-less payment transaction with a merchant restaurant 302.

The computing device obtains data describing a booking created by the first user for a shared financial expense at the merchant restaurant 304. The booking identifies a second user that is participating in the shared financial expense. The computing device obtains a total amount due for the shared financial expense 306. The computing device determines that the second user is contributing to the shared financial expense 308. The computing device generates a respective electronic bill for the first and second users 310. Each respective electronic bill is for an apportioned amount due for the shared financial expense. The computing device sends, to the first and second users, the respective electronic bill for the apportioned amount due for the shared financial expense 312.

Figure 4:
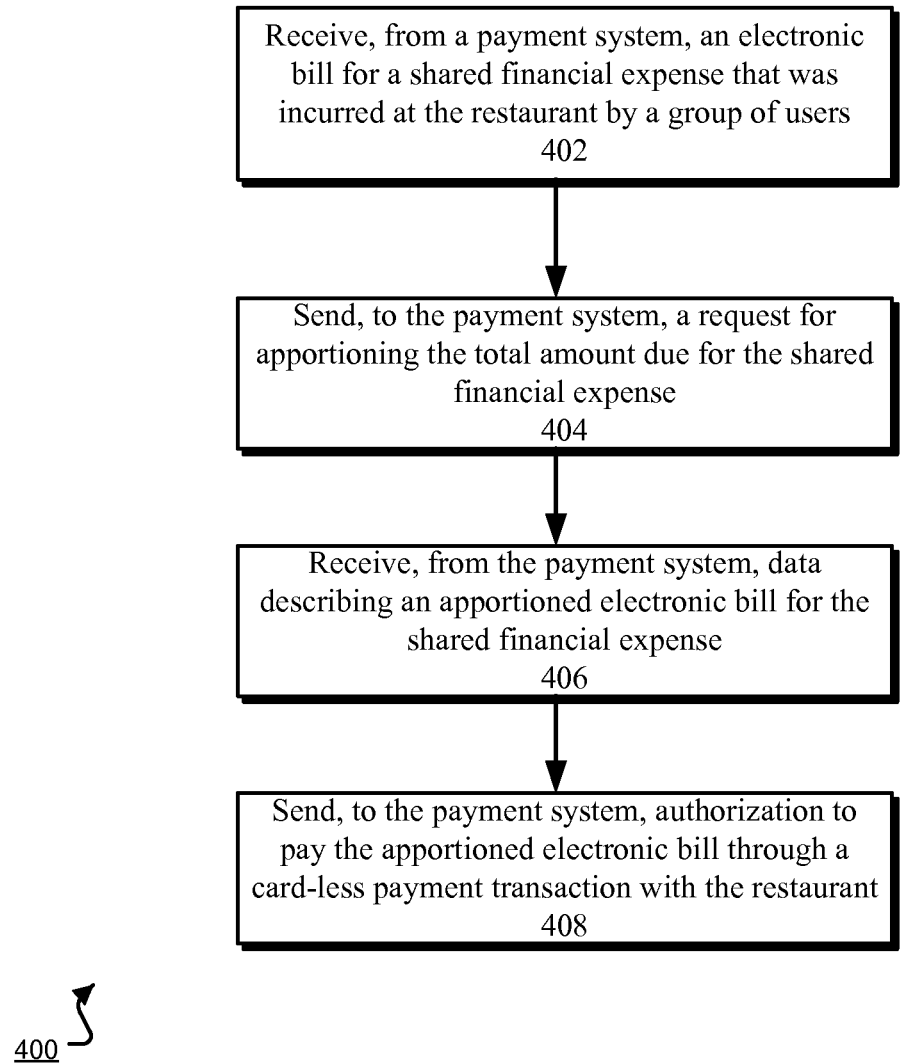
FIG. 4 is a flow diagram of an example process for requesting apportioning of an electronic bill among a group of users.

FIG. 4 is a flow diagram of an example process 400 for requesting apportioning of an electronic bill among a group of users. The example process 400 is provided merely as an example and additional or fewer steps may be performed in similar or alternative orders, or in parallel, within the scope of the various embodiments described in this specification. A user device receives, from a payment system, an electronic bill for a shared financial expense that was incurred at the restaurant by a group of users 402.

The data can describe a total amount due for the shared financial expense, one or more items that were purchased from the restaurant as part of the shared financial expense, respective amounts due for each of the one or more items, and one or more users in the group of users. The user device sends, to the payment system, a request for apportioning the total amount due for the shared financial expense 404. The user device receives, from the payment system, data describing an apportioned electronic bill for the shared financial expense 406. The apportioned electronic bill can be for an amount that is apportioned among the one or more users in the group of users. The user device sends, to the payment system, authorization to pay the apportioned electronic bill through a card-less payment transaction with the restaurant 408.

Figure 5:
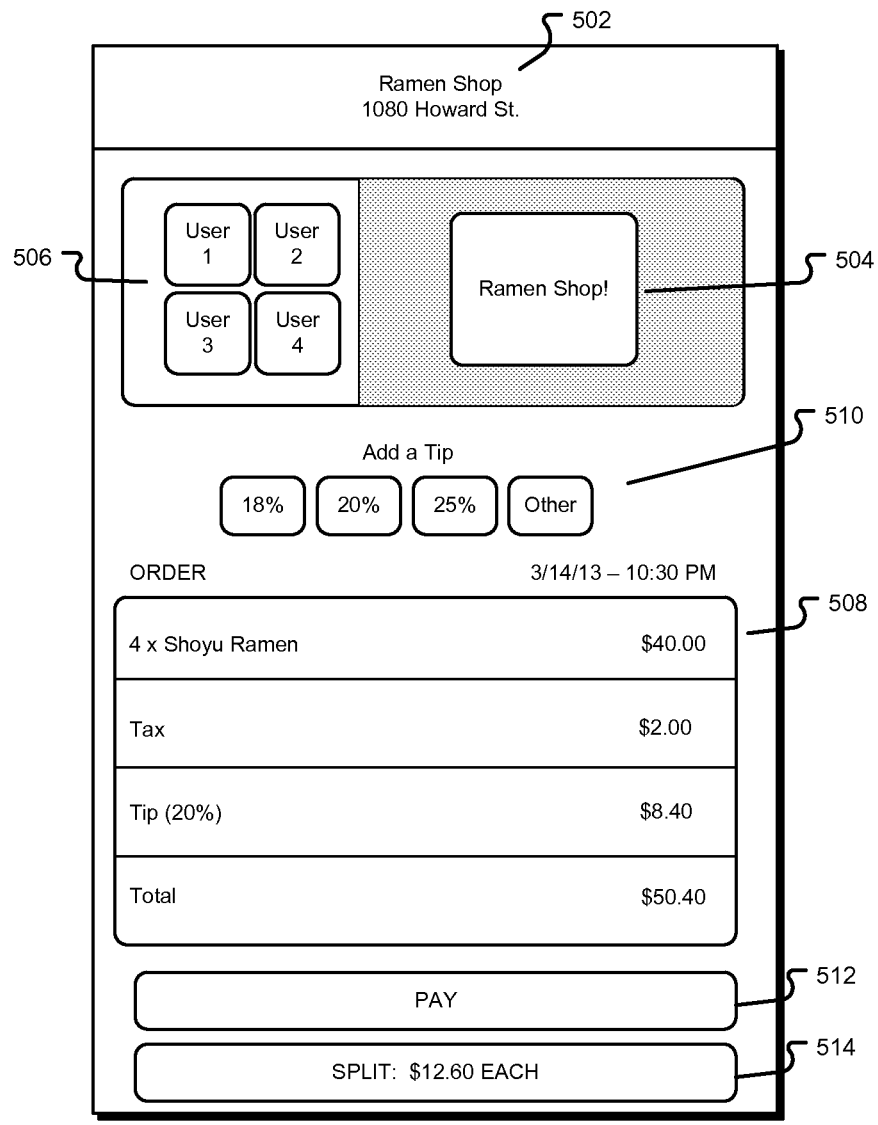
FIG. 5 illustrates an example application view for requesting apportioning of an electronic bill.

FIG. 5 illustrates an example application view 500 for requesting apportioning of an electronic bill. The application view 500 can be running on a user device, e.g., the user device 102, as described above. The user application 500 is shown displaying an electronic bill that was received for a shared financial expense. The electronic bill identifies a merchant name and contact information 502, a merchant logo 504, and one or more users 506 that were involved in the shared financial expense, e.g., user 1, user 2, user 3, and user 4. The one or more users 506 can be identified by a name, digital portrait, or a combination thereof, depending on the implementation. A user interacting with the user application can select a tip amount 510 to add to the order total.

The electronic bill also identifies an order summary 508 for the electronic bill. For example, the order summary 508 indicates that four items for "Shoyu Ramen" were purchased for a cost of $40. The order summary 508 also displays a tax, a calculated tip amount based on the user's selection of the tip amount 510, and a total amount due for the shared financial expense. The user interacting with the application view 500 can select a pay option 512 to pay for the total amount due for the shared financial expense. In some embodiments, the user can select a bill splitting option 514 to apportion the total amount due among one or more of the users 506 that were involved in the shared financial expense.

Figure 6:
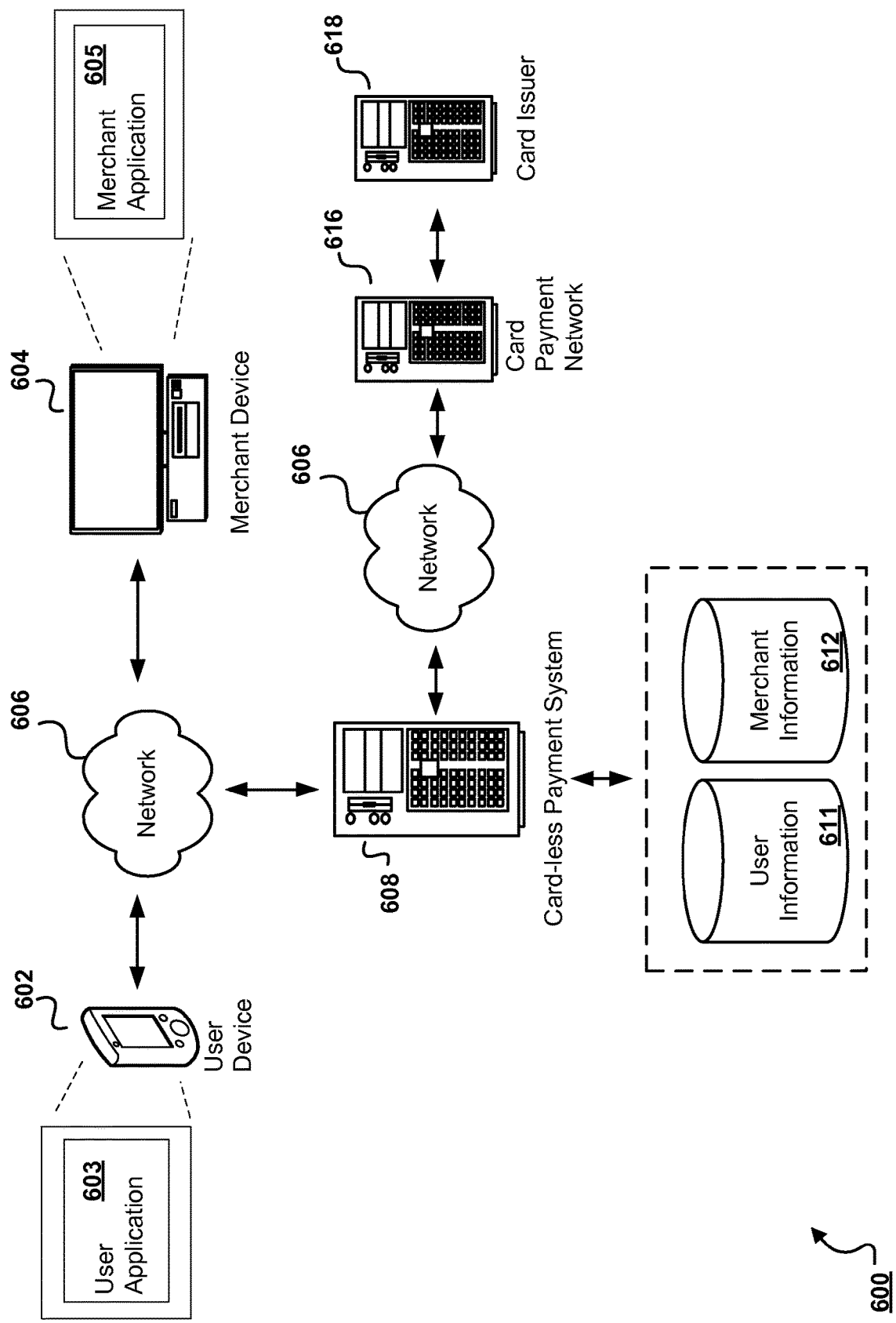
FIG. 6 illustrates an example of an environment for implementing a card-less payment system.

FIG. 6 illustrates an example of an environment 600 for implementing a card-less payment system 608. Although a mobile device environment is described for purposes of explanation, different environments may be used, e.g., a web-based environment, to implement various embodiments.

The example environment 600 includes a card-less payment system 608, which can be implemented as computer programs on one or more computers in one or more locations, in which the systems, components, and techniques described below can be implemented. The example environment 600 also includes a user device 602 and a merchant device 604.

As used in this specification, a card-less payment transaction is a transaction conducted between a user and a merchant at a point-of-sale during which a financial account of the user is charged without the user having to physically present the financial payment card to the merchant at the point-of-sale. That is, the merchant need not receive any details about the financial account, e.g., the credit card issuer or credit card number, for the transaction to be processed.

The user device 602 and the merchant device 604 can each be a computer coupled to the card-less payment system 608 through a data communication network 606, e.g., the Internet. The user device 602 and the merchant device 604 each generally include a memory, e.g., a random access memory (RAM), for storing instructions and data, and a processor for executing stored instructions. The user device 602 and the merchant device 604 can each include one or more components, e.g., software or hardware, that are configured to respectively determine a geographic location of the user device 602 or the merchant device 604, using, for example, various geolocation techniques, e.g., a global positioning system (GPS). Further, the user device 602 and the merchant device 604 can each be any appropriate device operable to send and receive requests, messages, or other types of information over the network 606. Some examples of user devices include personal computers, cellular phones, handheld messaging devices, laptop computers, personal data assistants, tablet devices, and the like.

The network 606 can include any appropriate network, including an intranet, the Internet, a cellular network, a local area network, a wide area network, or any other such network, or combination thereof. Components used for such a system can depend at least in part upon the type of network, the environment selected, or both. Protocols and components for communicating over such a network are well known and will not be discussed herein in detail. The card-less payment system 608, the merchant device 604, and the user device 602 can communicate over the network using wired or wireless connections, and combinations thereof.

Before conducting card-less payment transactions, a user typically creates a user account with the card-less payment system 608. The user can create the user account, for example, by interacting with a user application 603 that is configured to perform card-less payment transactions and that is running on the user device 602. When creating a user account with the card-less payment system 608, the user will portrait of the user, data describing a financial account of the user, e.g., credit card number, expiration date, and a billing address. This user information can be securely stored by the card-less payment system 608, for example, in a user information database 611. To accept card-less payment transactions, a merchant typically creates a merchant account with the card-less payment system 608 by providing information describing the merchant including, for example, a merchant name, contact information, e.g., telephone numbers, the merchant's geographic location address, and one or more financial accounts to which funds collected from users will be deposited. This merchant information can be securely stored by the card-less payment system 608, for example, in a merchant information database 612.

The card-less payment system 608 is configured to perform card-less payment transactions. The card-less payment system 608 can include one or more servers that are configured to securely perform electronic financial transactions, e.g., electronic payment transactions, between a user and a merchant, for example, through data communicated between the user device 602 and the merchant device 604. Generally, when a user and a merchant enter into an electronic financial transaction, the transaction is processed by transferring funds from a financial account associated with the user account to a financial account associated with the merchant account.

The card-less payment system 608 is configured to send and receive data to and from the user device 602 and the merchant device 604. For example, the card-less payment system 608 can be configured to send data describing merchants to the user device 602 using, for example, the information stored in the merchant information database 612. For example, the card-less payment system 608 can communicate data describing merchants that are within a threshold geographic distance from a geographic location of the user device 602, as described in this specification. The data describing merchants can include, for example, a merchant name, geographic location, contact information, and an electronic catalogue, e.g., a menu, that describes items that are available for purchase from the merchant.

In some embodiments, the card-less payment system 608 is configured to determine whether a geographic location of the user device 602 is within a threshold geographic distance from a geographic location of the merchant device 604. The card-less payment system 608 can determine a geographic location of the user device 602 using, for example, geolocation data provided by the user device 602. Similarly, the card-less payment system 608 can determine a geographic location of the merchant device 604 using, for example, geolocation data provided by the merchant device 604 or using a geographic address, e.g., street address, provided by the merchant. Depending on the implementation, the threshold geographic distance can be specified by the card-less payment system 608 or by the merchant.

Determining whether the user device 602 is within a threshold geographic distance of the merchant device 604 can be accomplished in different ways including, for example, determining whether the user device 602 is within a threshold geographic radius of the merchant device 604, determining whether the user device 602 is within a particular geofence, or determining whether the user device 602 can communicate with the merchant device 604 using a specified wireless technology, e.g., Bluetooth or Bluetooth low energy (BLE). In some embodiments, the card-less payment system 608 restricts card-less payment transactions between the user and the merchant to situations where the geographic location of the user device 602 is within a threshold geographic distance from a geographic location of the merchant device 604.

The card-less payment system 608 can also be configured to communicate with a computer system 616 of a card payment network, e.g., Visa or MasterCard, over the network 606, or over a different network, for example, to conduct electronic financial transactions. The computer system 616 of the card payment network can communicate with a computer system 618 of a card issuer, e.g., a bank. There may be computer systems of other entities, e.g., the card acquirer, between the card-less payment system 608 and the computer system 618 of the card issuer.

The user operating the user device 602 that is within a threshold geographic distance of a particular merchant can interact with a user application 603 running on the user device 602 to conduct a card-less payment transaction. While interacting with the user application 603, the user can select the particular merchant, from a listing of merchants, with whom the user wants to enter into a card-less payment transaction. The user can select the particular merchant, for example, by selecting a "check in" option associated with the particular merchant. The user device 602 can communicate data notifying the card-less payment system 608 that the user has checked in with the merchant. In response, the card-less payment system 608 can communicate data to notify the merchant device 604 that the user has checked in. A merchant application 605 running on the merchant device 604 can notify the particular merchant that the user has electronically checked in with the particular merchant through a display screen of the merchant device 604.

Once checked in, the user can collect, or request, items, e.g., goods or services, that are available for purchase from the merchant. When the user is ready to enter into the card-less payment transaction, the user can, for example, approach a point-of-sale for the merchant and identify him or herself. For example, the user can verbally notify the merchant that the user wants to enter into a card-less payment transaction and can provide the merchant with the user's name. The merchant can then interact with the merchant application 605 to select the user, from a listing of users that have checked in with the merchant, to initiate a card-less payment transaction for the items being purchased by the user. For example, the merchant can determine a total amount to bill the user for the items being purchased. The user can verbally approve the total amount to be billed and, in response, the merchant can submit a request for a card-less payment transaction for the total amount to the card-less payment system 608. In response, the card-less payment system 608 can obtain, for example, from the user information database 611, data describing a financial account associated with a user account of the user to which the total amount will be billed.

The card-less payment system 608 can then communicate with the computer system 616 of a card payment network to complete an electronic financial transaction for the total amount to be billed to the user's financial account. Once the electronic financial transaction is complete, the card-less payment system 608 can communicate data describing the card-less payment transaction to the user device 602, e.g., an electronic receipt, which can, for example, notify the user of the total amount billed to the user for the card-less payment transaction with the particular merchant.

The various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business map servers. The server (s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for automating processing of a transaction between a first customer and a first merchant based on wireless connectivity between a merchant device associated with the first merchant and a customer device associated with the first customer, the method comprising:
   storing, by a payment service system, customer information for a plurality of customers including the first customer, wherein the customer information includes a customer identifier and a payment account identifier corresponding to a payment account associated with each customer of the plurality of customers, wherein the payment service system is in communication with a plurality of merchant devices at a plurality of merchant locations;
   detecting, by the merchant device associated with the first merchant and based on one or more wireless communications between the merchant device and the customer device associated with the first customer, that the customer device is within a perimeter of a merchant location associated with the first merchant;
   initiating a check-in automatically based on detecting that the customer device is within the perimeter of the merchant location;
   receiving, by the payment service system and from the customer device after the check-in, an authorization to automatically pay the first merchant for purchase activity upon a check-out;
   transferring information about the first customer from the payment service system to the merchant device associated with the first merchant between the check-in and the check-out, the information about the first customer confirming the authorization;
   receiving, by the merchant device, input about the purchase activity based on interactions of the first customer with the first merchant between the check-in and the check-out;
   detecting, by the merchant device and based on the merchant device being no longer able to wirelessly communicate with the customer device, that the customer device is no longer within the perimeter of the merchant location;
   initiating the check-out automatically based on detecting that the customer device is no longer within the perimeter of the merchant location;
   transferring transaction information identifying the purchase activity and a customer identifier of the first customer from the merchant device to the payment service system automatically in response to the check-out;
   identifying, by the payment service system, a payment account associated with the customer identifier of the first customer; and
   charging, by the payment service system, the payment account associated with the customer identifier of the first customer for the purchase activity based on the authorization.

2. The method of claim 1, further comprising receiving, by the merchant device, input identifying the customer identifier of the first customer.

3. The method of claim 1, further comprising:
   receiving, by the merchant device, input about additional purchase activity based on interactions of a second customer with the first merchant between the check-in and the check-out;
   identifying, by the payment service system, a second payment account associated with a customer identifier of a second customer, wherein the transaction information also identifies the additional purchase activity and the customer identifier of the second customer; and
   charging, by the payment service system, the second payment account associated with the customer identifier of the second customer for additional purchase activity.

4. The method of claim 1, wherein the one or more wireless communications between the merchant device and the customer device include one or more short-range wireless communications.

5. A method for automating processing of a transaction between a first customer and a first merchant, the method comprising:
   storing, by a merchant device associated with the first merchant, an identifier corresponding to the first customer;
   detecting, by a merchant device associated with the first merchant and based on one or more wireless communications between the merchant device and a customer device associated with the first customer, that the customer device is within a perimeter of a merchant location associated with the first merchant;
   initiating a check-in automatically based on detecting that the customer device is within the perimeter of the merchant location;
   receiving, from the customer device after the check-in, an authorization to automatically pay the first merchant for purchase activity upon a check-out;
   receiving information about the first customer from a payment service system at the merchant device associated with the first merchant between the check-in and the check-out, the information about the first customer confirming the authorization;
   receiving, by the merchant device, input about purchase activity based on interactions of the first customer with the first merchant between the check-in and the check-out;
   detecting, by the merchant device and based on the merchant device being no longer able to wirelessly communicate with the customer device, that the customer device is no longer within the perimeter of the merchant location;
   initiating the check-out automatically based on detecting that the customer device is no longer within the perimeter of the merchant location; and
   transferring transaction information from the merchant device to the payment service system automatically in response to the check-out, the transaction information identifying the purchase activity and the identifier corresponding to the first customer based on the authorization.

6. The method of claim 5, further comprising reading the identifier corresponding to the first customer via a point-of-sale reader associated with the merchant device and from a financial payment card associated with the first customer.

7. The method of claim 5, wherein the identifier corresponding to the first customer identifies a user account that corresponds to the first customer at the payment service system, wherein the user account is linked to a payment account associated with the first customer.

8. The method of claim 5, wherein the one or more wireless communications between the merchant device and the customer device include one or more short-range wireless communications.

9. The method of claim 5, wherein the perimeter of the merchant location corresponds to a range of the one or more wireless communications.

10. The method of claim 5, further comprising:
    storing, by the merchant device associated with the first merchant, a second identifier corresponding to a second customer; and
    receiving, by the merchant device, input about additional purchase activity based on interactions of the second customer with the first merchant between the check-in and the check-out, wherein the transaction information also identifies the additional purchase activity and the second identifier corresponding to a second customer.

11. The method of claim 10, further comprising:
    calculating an amount due to the first merchant associated with the purchase activity and the additional purchase activity; and
    apportioning the amount due to the first merchant into a first amount corresponding to the purchase activity and a second amount corresponding to the additional purchase activity.

12. The method of claim 5, wherein the transaction information includes a request that the payment service system transfer an amount corresponding to the purchase activity from a payment account associated with the identifier corresponding to the first customer to a merchant account associated with the first merchant.

13. The method of claim 5, wherein the one or more wireless communications between the merchant device and the customer device are communicated within a wireless local area network associated with the first merchant.

14. The method of claim 5, wherein the authorization is received while the customer device is within the perimeter of the merchant location.

15. The method of claim 13, wherein the perimeter of the merchant location corresponds to the wireless local area network.

16. The method of claim 5, wherein the perimeter of the merchant location corresponds to a threshold geographic distance identified at the merchant device.

17. The method of claim 5, further comprising receiving a reservation request including the identifier associated with the first customer, wherein the purchase activity corresponds to the reservation request.

18. A method for automating processing of a transaction between a first customer and a first merchant, the method comprising:
    storing, by a payment service system, customer information for a plurality of customers including the first customer, wherein the customer information includes a customer identifier and a payment account identifier corresponding to a payment account associated with each customer of the plurality of customers, wherein the payment service system is in communication with a plurality of merchant devices at a plurality of merchant locations, wherein a first merchant device of the plurality of merchant devices is associated with the first merchant;
    sending, from the payment service system to the first merchant device, an identifier associated with the first customer;
    receiving, by the payment service system and from the first merchant device, an indication that a customer device associated with the first customer is within a perimeter of a merchant location associated with the first merchant based on one or more wireless communications between the first merchant device and the customer device;
    initiating a check-in automatically based on detecting that the customer device is within the perimeter of the merchant location;
    receiving, from the customer device after the check-in, an authorization to automatically pay the first merchant for purchase activity upon a check-out;
    transferring information about the first customer from the payment service system to the first merchant device associated with the first merchant between the check-in and the check-out, the information about the first customer confirming the authorization;

receiving, by the payment service system and from the first merchant device, an indication that the customer device is no longer within the perimeter of the merchant location based on the first merchant device being no longer able to wirelessly communicate with the customer device;

initiating the check-out automatically based on detecting that the customer device is no longer within the perimeter of the merchant location;

receiving, by the payment service system and from the first merchant device, a customer identifier of the first customer and transaction information identifying purchase activity, the purchase activity occurring between the check-in and the check-out;

identifying, by the payment service system and based on the customer information, a payment account associated with the customer identifier of the first customer; and charging, by the payment service system, the payment account associated with the customer identifier of the first customer for the purchase activity based on the authorization.

19. The method of claim 18, further comprising:

receiving, at the payment service system, a reservation request from the customer device associated with the first customer;

generating a reservation for the first customer with the first merchant; and sending, from the payment service system to the first merchant device, the customer identifier of the first customer and an information identifying the reservation, wherein the purchase activity corresponds to the reservation.

20. The method of claim 18, wherein charging the payment account associated with the customer identifier of the first customer for the purchase activity includes transferring funds from the payment account associated with the customer identifier of the first customer to a merchant account associated with the first merchant.

21. The method of claim 18, further comprising:

generating a receipt identifying at least one or more purchases and one or more payment amounts associated with the purchase activity; and sending the receipt to the customer device associated with the first customer.

* * * * *